United States Patent [19]
Gibson et al.

[11] Patent Number: 5,792,518
[45] Date of Patent: Aug. 11, 1998

[54] ON-SITE PIPE COATING PROCESS

[76] Inventors: Mark Gibson, PO Box 1500-1209, Etobicoke, Ontario, Canada, M9C4V5; Kenneth Fogh, Utopia, Ontario, Canada, L0M1T0

[21] Appl. No.: 591,508

[22] PCT Filed: Jun. 7, 1995

[86] PCT No.: PCT/CA95/00340

§ 371 Date: Oct. 8, 1996

§ 102(e) Date: Oct. 8, 1996

[87] PCT Pub. No.: WO95/33579

PCT Pub. Date: Dec. 14, 1995

[51] Int. Cl.$^6$ .................................................. B05D 1/02
[52] U.S. Cl. .................. 427/447; 427/142; 427/203; 427/270; 427/271; 427/287; 427/292; 427/318; 427/327; 427/355; 427/410; 427/435; 427/442; 427/443.2
[58] Field of Search .................................. 427/447, 142, 427/203, 270, 271, 287, 292, 318, 327, 355, 410, 435, 442, 443.2

[56] References Cited

U.S. PATENT DOCUMENTS

| | | | |
|---|---|---|---|
| 2,366,718 | 12/1945 | Guzzetta | 122/478 |
| 2,716,075 | 8/1955 | Wiese | 428/448 |
| 2,718,473 | 9/1955 | Powers | 427/447 |
| 3,502,492 | 3/1970 | Spiller | 138/146 |
| 4,312,902 | 1/1982 | Murase et al. | 427/386 |
| 4,786,339 | 11/1988 | Meyer et al. | 148/276 |
| 4,990,383 | 2/1991 | Bergström et al. | 428/35.9 |
| 5,073,414 | 12/1991 | Castro | 427/447 |
| 5,178,902 | 1/1993 | Wang et al. | 427/470 |

FOREIGN PATENT DOCUMENTS

WO9003850  4/1990  European Pat. Off.

*Primary Examiner*—Bernard Pianalto
*Attorney, Agent, or Firm*—Huntley & Associates

[57] ABSTRACT

The present invention relates to a pipe treatment process that is a portable, field-applied, coating process. The process produces a two-layer composite protective coating system with a finished, seamless, chemical bond within its interlayers as well as to adjacent coating materials. The process is suitable for both metallic and concrete substrates, which may or may not be cathoadically protected, and may be used to either coat now or to recoat e.g. repair, previously coated metallic or concrete

23 Claims, 3 Drawing Sheets

ON-SITE PIPE COATING PROCESS

BACKGROUND OF THE INVENTION

It is common practice to coat sections of new pipelines off-site in a pipe manufacturing operation or at a site other than in-line on the pipeline, to protect the pipeline from corrosion or mechanical damage. Typical coatings Include fusion bonded epoxy powder, extruded bitumen polyethylene combinations, tape wraps, coal tar enamels or liquid thermoset materials. After assembly or construction of the pipeline there are sections such as steel pipeline girth welds, steel valves and other steel pipeline fittings and assemblies that also require coating for protection from corrosion or mechanical damage. A wide variety of portable, field-applied coatings are available to protect the new sections of the pipeline. It is important for the long term protection of the pipeline that all sections of the pipeline have a viable coating.

Such new field-applied coatings can include, for example, tape wraps comprising polyethylene film/butyl rubber elastomer combinations, polyvinyl chloride filmbitumen rubber elastomer combinations, or petroleum, all of which may be applied either mechanically or by hand to the substrate; heat-shrink sleeves which can be applied by hand to the substrate and then heated by torch to Induce their shrinking properties: fusion bonded apoxy powders which are mechanically applied only to a round girth weld or similar round structure; and twopart liquid epoxies which require either hand or mechanical mixing before being applied either by brush, by railer or by airless spray equipment.

In addition to the above, a wide variety of portable, field-applied coatings are in use to recoat previously coated, and partially protected, aged metallic substrate. These include older and In service steel pipeline girth welds, replacement steel valves, steel pipeline fittings and assemblies and steel line pipe, all of which may have damaged coatings. Such aged substrates are normally coated with e.g. mill-applied fusion bonded epoxy powder, mill-applied extruded bitumen/polyethylene tape wraps, liquid coat tar enamels, liquid apoxes, or liquid urethane. The recoat coatings can include tape wraps, e.g. comprising polyethylene film/butyl rubber elastomer combinations, polyvinyl chloride film/bitumen rubber elastomer combinations or petroleum, all of which can be applied either mechanically or by hand to the substrate; heat-shrink sleeves which may be applied either mechanically or by hand to the substrate, and then heated by torch to induce their shrinking properties: fusion bonded epoxy powders which are mechanically applied only to a round girth weld or similar round structure; two-part liquid poxies which require either hand or mechanical mixing avid are then applied either by brush, by roller or by airless spray equipment; and modified liquid urethane which require either hand or mechanical mixing and then are applied either by brush, by roller or by airless spray equipment.

Portable, field-applied coatings may also be applied to new metallic substrates such as steel pipeline girth welds and other steel pipeline fitting, and assemblies, on mill-coated, two and three layer, composite coated, straight line pipe. Examples of such pipe are produced by Shaw Pipe Protection Limited of Canada, Elf Atochem of France and Mannesmann AG of Germany. These field-applied coatings can include: tape wraps comprising polyethylene film/butyl rubber elastomer combinations, polyvinyl chloride film/bitumen rubber elastomer combinations or petroleum, all of which can be applied either mechanically or by hand to the substrate; and heat-shrink sleeves which can be applied by hand to the substrate and then heated by torch to induce their shrinking properties.

Where the substrate is concrete, a wide variety of portable, hold-applied coatings are in use to protect new and aged concrete substrates such as walls, floors and other containment structures from acidic environments or to protect marine pilings from salt water corrosion. Such new and recoat coatings can include: liners comprising polyethylene film/butyl rubber elastomer combinations, polyvinyl chloride film/bitumen rubber elastomer combinations or petroleum, all of which can be applied either mechanically or by hand to the substrate two-part liquid epoxies which require either hand or mechanical mixing and then are applied either by brush, by roller or by airless spray equipment; and modified liquid urethane which require either hand or mechanical mixing and then are applied either by brush, by roller or by airless spray equipment While each of these field-applied coatings is useful in certain applications, there are compatibility and performance limitations on both now and aged metallic and concrete substrates. For instance, certain field-applied coatings cannot be used in conjunction with the current mill-coated, two and three layer composite systems found on new metallic substrates such as steel line pipe, while those that can be used tend to offer much poorer protection when compared to the original composite coating, it would be beneficial to reduce or eliminate these limitations. Moreoer, in situ coating repairs arm difficult or impossible to accomplish In a manner that re-coats the pipeline with the coating originally applied to the pipe In a plant site.

Fusion bonded epoxy powders generally exhibit excellent adhesion and excellent cathodic disbandment properties. However, these coatings tend to be brittle and prone to handling damage and to display high moisture permeation. Such coatings are useful as a new coating on metallic substrates, but generally are not chemically compatible with other coatings such as extruded plastics and plastic films. This excludes them from use with such dissimilar coated surfaces. For instance, fusion bonded epoxy powders, by themselves, are not compatible or reliable coatings with two or three layer, mill-coated composites as found on new steel line pipe.

Thermoset coatings, which include two-part liquid epoxy and two-part liquid urethanes, generally exhibit excellent adhesion and cathodic disbandment properties. However, these coatings also tend to be brittle and prone to handling damage and to display high moisture permeation. Thermoset coatings work well as either a new or recoat coating on both metallic and concrete substrates when the already-applied coating is also a thermoset material or a fusion bonded epoxy powder, but as they are not chemically compatible with other coatings such as extruded plastics and plastic films, they tend not to be unable with such dissimilar coated surfaces. Thermoset coatings, by themselves, generally are not reliable with two or three layer, mill-coated composites as found on new steel line pipe.

Tape wraps and heat-shrink sleeves show a much lower adhesion to both metal and concrete substrate as well as to other coatings, when compared to thermoset materials bonded to either metal or concrete or to other thermoset material. Consequently, they do not withstand attacks from soil stress and soil loads, common situations for buried meal pipe and buried concrete structures. Tapes and sleeves also leave a visible seam with the underlying substrate, which Is susceptible to adhesion failure. The adhesive failure can provide a path through which moisture and other contaminants can migrate to undermine the integrity of the remaining bond and attack the underlying substrate. Tapes and heat shrink sleeves, by themselves, offer much poorer coating protection than the original coating, when-used with two and three layer, mill-coated composites as found on new steel line pipe.

Examples of fusion bonded epoxy powders include D1003DL and D1003HW available from Vaispar, Scotchkote™ 206N Standard and 206N Slow available from 3M and 7-2500 from Napco. Examples of liquid epoxy include Kama™ 500 from Kemacoat International, Denso Protal and Valpipe™ 500 from Valapar. Examples of modified liquid urethanes include Vaispar Vaipipe 100 and Protegal. Examples of heat-shrink sleeves are available from Raychem and canusa. Examples of tape wraps are available from kemacoat intentional, Winn & Coales, Denso North America, Polyken Technologies and The Tapecoat Company.

An example of a mill-applied, high performance, multilayer composite coating is described in U.S. Pat. No. 5,78, 102 (Wong at al). Examples of multilayer coatings utilizing both a fusion bonded epoxy layer and a polyolefin layer are described in U.S. Pat. No. 4,045,355 (Sakayorl et al.); 4,213,486 (Sarnour at al.); 4,312,902 (Murase et al.); 4,346, 004 (Mlyata et al.); 4,481,239 (Eckner): 4,885,985 (Stucke); 4,519,883 (Landgraf at al.); 4,461,413 (Stucke at al.); and 4,386,996 (Landgraf et al.), and published PCT application WO 90103850 (Vanharen).

SUMMARY OF THE INVENTION

It is the object of an aspect of the present Invention to provide a new portable and field-applied, coating process that produces a two-layer composite, protective coating with a finished, seamless bond between its Interlayers and to other adjacent coating materials and which may be used to cost now or to recoat previously costed, cathodically protected or not, metallic or concrete substrates.

Accordingly, the present invention provides a method for repair of a defective section of a protective coating on the exterior of a metal pipeline in the field, comprising:

(a) stripping a portion of said protective coating from said pipeline, said portion including the defective section of the protective coating;

(b) forming a clean metal surface on said portion of the pipeline;

(c) applying an undercoat of at least 5 mil of liquid polyepoxide or polyurethane composition to said clean metal surface, said composition having a curing agent for said polyepoxides or polyurethane;

(d) optionally applying a non-melted, powder layer of a thermoplastic polyolefin selected from ethylene (meth) acrylic acid copolymers and polyolefins modified with functional ethylenically unsaturated carboxylic acid groups or derivatives by means of forced air onto the entire surface of the uncured undercoat and onto the protective coating adjacent thereto;

(e) allowing the undercoat to cure until the coating exhibits no flow when a stream of heated air is applied; and (f) thermospraying a topcoat of at least 5 mil of a thermoplastic polyolefin selected from ethylenel(meth) acrylic acid copolymers and polyolefins modified with functional ethylenically unsaturated carboxylic acid groups, or derivative thereof, onto said undercoat, said thermospraying being carried out at a temperature such that the polyolefin is molten and undergoes melt flow on contacting the undercoat and protective coating adjacent thereto.

The present invention further provides a method for application of an exterior protective coating an a minor section of a metal pipeline, comprising:

(a) providing a clean metal surface;

(b) applying an undercoat of at least 5 mil of liquid polyepoxide or polyurethane composition to said clean metal surface, said composition having a curing agent for said polyepoxide or polyurethane;

(c) optionally applying a non-melted, powder layer of a thermoplastic polyolefin selected from ethylene (meth) acrylic acid copolymers and polyolefins modified with functional ethylenically unsaturated carboxylic acid groups or derivatives by means of forced air onto the surface of the uncured undercoat and onto the protective coating adjacent thereto;

(d) allowing the undercoat to cure until the coating exhibits no flow when a stream of heated air is applied, and (e) thermospraying a topcoat of at least 5 mil of a thermoplastic polyolefin selected from ethenylene (meth)acrylic acid copolymers and polyolefins modified with functional ethylenically unsaturated carboxylic acid groups, or derivative thereof, onto said undercoat, said thermospraying being carried cut at a temperature such that the polyolefin is molten and undergoes melt flow on contacting the undercoat and the protective coating adjacent thereto.

BRIEF DESCRIPTION OF THE DRAWINGS

The invention will now be described with reference to the embodiments shown in the drawings, in which.

DETAILED DESCRIPTION OF THE INVENTION

The method of the present invention is a portable, field-applied method. It is understood that the method is intended for use in the field i.e. on existing, installed pipelines, which may or may not be operating at the time the method is used. Suitable removal of soil or the like from around the pipeline is required, as will be understood by persons skilled in the art.

The nature of the bond between the thermosetting polymer viz liquid polyepoxide or polyurethane composition, and the thermoplastic polyolefin appears to be an intermingling of undercoat and top cost materials to form a blended material which might be described as a "plastics material composite". In a preferred embodiment discussed below, an additional step is taken to form plastic material composite.

The undercoat, which is adherent to the metal surface, may be applied by brushing, spraying or rolling and may form a mechanical and/or chemical bond with the pipe profile.

The metal surface may be a partially exposed surface of a previously coated metal pipe or may be a clean surface of an unused manufactured line pipe. When these pipes or articles have been previously coated with continuous coatings or wrappings and the inventive coating of the invention is to be utilized in a previously coated area, it is necessary to clean the previous coating from a discrete area to be coated according to the invention. For example, if a defect occurs in a coating of a previously coated pipe, it is necessary to clean the previous coating away from the pipe in the region of its defect, and the immediately surrounding area. The inventive coating may then be applied, firstly the layer of liquid thermosetting polymer onto the exposed metal, and secondly, the thermospray of molten modified thermoplastic polyolefin, optionally with the additional powder layer discussed herein.

Thermospraying may be carried out at an elevated temperature to promote blending and bonding between the undercoat and topcoats, for example, in the range of from about 80° C. 210° C., preferably in the region of about 175° C. when the modified polyolefin is a modified polyethylene. When the modified polyolefin is polypropylene, then these temperatures may be somewhat higher. However, the modified polyolefin must be applied in molten form so as to undergo melt flow on contact with the undercoat and the existing and remaining adjacent protective coating.

Figure 1:
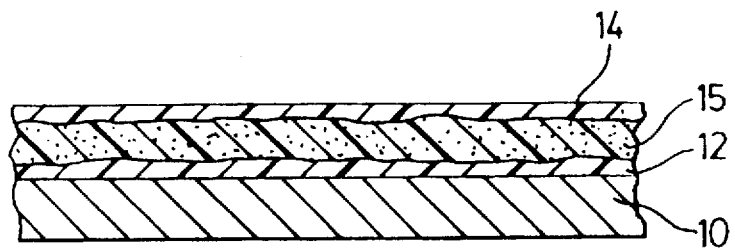
FIG. 1 shows a schematic representation of the layers of a coating applied by a process according to the invention.

FIG. 1 shows a metal surface 10 coated according to the invention. The coating comprises an undercoat 12 of thermosetting polymer, obtained from a liquid polyurethane or polyepoxide, and a topcoat 14 of thermoplastic polyolefin, e.g. a modified polyethylene or polypropylene or ethylene/ acryllic acid copolymer. Intermediate layer 15 of plastics material composite is shown between the topcoat 14 and the undercoat 12. It is believed that intermediate layer 15 may be formed when topcoat 14 is applied to undercoat 12. However, intermediate layer 15 may be formed in a separate step, as discussed heroin with reference to application of an additional optional layer, it is further understood that the layers of undercoat 12, topcoat 14 and intermediate layer 15 will, to a significant extent not be separate and distinct layers but rather show a transition in composition between undercoat 12 and topcoat 14.

It should be understood that the thicknesses of the undercoat, intermediate layer and topcoat shown in FIG. 1 and elsewhere are not to scale.

Figure 2:
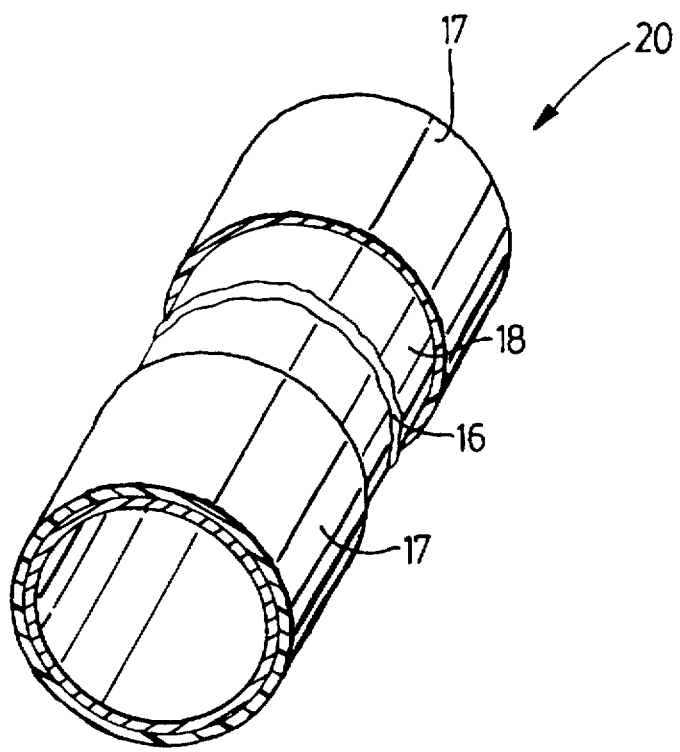
FIG. 2 shows a portion of pipe having a girth weld around its circumference and having a coat by a process of the present invention.

FIG. 2 shows a length of pipe 20 having a girth weld 16 adjoining adjacent pipe lengths. It will be appreciated that while FIG. 2 illustrates a weld 16, the present invention will be equally applicable to any type of join between two pipes or to a join between pipe lengths and a T-junction for a reducer or an elbow or the like. Moreover, the process of the invention might equally be applied to any weakened area of the pipe coating and the description with respect to the embodiment of FIG. 2 would equally apply to any such weakened area.

When line pipe 20 that has already been provided with a conventional coating is initially laid or when it 14 uncovered for rehabilitation or repair, it may be treated by the process of the invention. One embodiment of such a process will now be described.

The welded pipes, 20, are thoroughly cleaned in the region of weld 16 and outbacks 18 located on each side of weld 15. Cleaning may be by sandblasting or by other conventional means. The level of cleaning may be SSPC-SP2 (simple wire brushing) up to SP5, SPS or SP10 (SP10 is sandblasting) to remove as much as 4 mils of existing metal surface. It is understood that a section of existing coating may have to be removed, especially where it is believed to be detective, to provide a clean surface where a repair is required. For a new pipeline, less cleaning may be required. It is understood that chromium, zinc or other metal treatments may be applied to the pipe after cleaning but prior to application of liquid undercoats.

After cleaning of cutback 18 and weld 16 between lengths of pipe, which itself is coated with coating 17 except in the area of the cutback and the weld, the cleaned section of pipe is coated with undercoat 12 of liquid thermosetting polymer which will adhere to the metal surface of the pipe and may also blend with the subsequently applied topcoat 14 of thermoplastic polyolefin. The coating 12 may be applied by brushing, spraying or rolling liquid over the cutback 18 and weld 16.

The thermosetting polymer may be a liquid polyepoxide or a polyurethane composition. The thermosetting polymer is applied as a liquid, in a thickness of at least 5 mils, e.g. 5–40 mils, especially 10–20 mils, at ambient temperature. It is not necessary to heat the pipe, although this may be done. If the liquid coating is a polyepoxide, it is preferred that the ambient temperature be at least 10° C. If the liquid coating is a polyurethane, it is preferred that the ambient temperature be at least 20° C. After application of the liquid polyepoxide or polyurethane, the resultant undercoat is permitted to cure to an extent that there is no flow of the coating when a stream of hot air is applied. Such heated air may be from a thermospray apparatus, which frequently exhibits temperatures of about 550–1000° C. at the nozzle thereof. It is understood mat when no flow of the coating is exhibited, application of heat may result In further curing of the undercoat, and even burning of the undercoat.

The time required for sufficient curing of the undercoat depends on the ambient temperature, but typically takes 4–24 hours. This is convenient for operation of the process, as it eliminates the need to apply a topcoat immediately. A pipeline at ambient temperature also facilitates this, although a low amount of heat may be applied to the pipeline.

Examples of polypoxides include KEMA 500 as manufactured by Komacoat international Inc., PROTAL 5900 as manufactured by Denso North America, and SPC 2888 as manufactured by Specialty Polymer Coatings.

Examples of polyurethanes include VALPIPE 100 as manufactured by the Valapar Corporation, KEMA 100 as manufactured by Kemacoat International Inc., and PROTEGOL, manufactured in West Germany.

It is understood that both the polyepoxide and polyurethane composition as applied to the pipe will contain a curing agent, as is known for such compositions.

When the undercoat has reached the no-flow condition discussed above, the topcoat is applied.

The overcoat or topcoat 14 of a polyolefin is applied thereover by thermospraying, e.g. by flame or flameless sprayers, to form a bond which has been referred to herein as a plastics material composite between the undercoat and the topcoat. Thermosprayers are known, and include The Falcon and The Hawk, both manufactured by American Thermoplastics Inc., and The 124 Powder Master and The 124 Powder Pistol, both manufactured by Plastic Flamecoat Systems.

The polyolefin coating is applied in a thickness of at least 5 mils, e.g. 5–40 mils, especially 10–20 mils, onto the undercoat 12 and the adjacent existing protective coating 17, by thermospraying at a temperature such that the polyolefin is molten, and moreover melt flows on contact with the undercoat. The temperature required depends on the particular polyolefin and whether any heat has been applied to the pipe, but in any event does not need to be measured as the acceptability of the applied topcoat is determined by noting the melt flow of the polymer. It is to be understood that excess temperatures that degrade the topcoat should be avoided.

The polyolefin may be a polyolefin modified (grafted) with the functional ethylenically unsaturated carboxylic acid or derivative thereof, or the polyolefin may be formed from olefin monomers that have been copolymerized with the functional ethylenically unsaturated carboxylic acid. In embodiments, the polyolefin may be a thermoplastic polyolefin modified with at least one ethylenically unsaturated carboxylic acid, or derivative thereof, especially an anhydride or ester thereof. Examples of such functional ethylenically unsaturated carboxylic acids include maleic acid, maleic anhydride and acrylic acid. Examples of polyolefins that may be grafted include polyethylene, polypropylene, ethylene/vinyl acetate copolymers, copolymers of ethylene or propylene with other monomers e.g. acrylic or methacrylic acid and esters, carbon monoxide and the like, with which a preferred grafting monomer is maleic anhydride. Examples of copolymers include ethylene/acrylic acid copolymers (EAA) and ethylenelmethacrylic acid.

Figure 3:
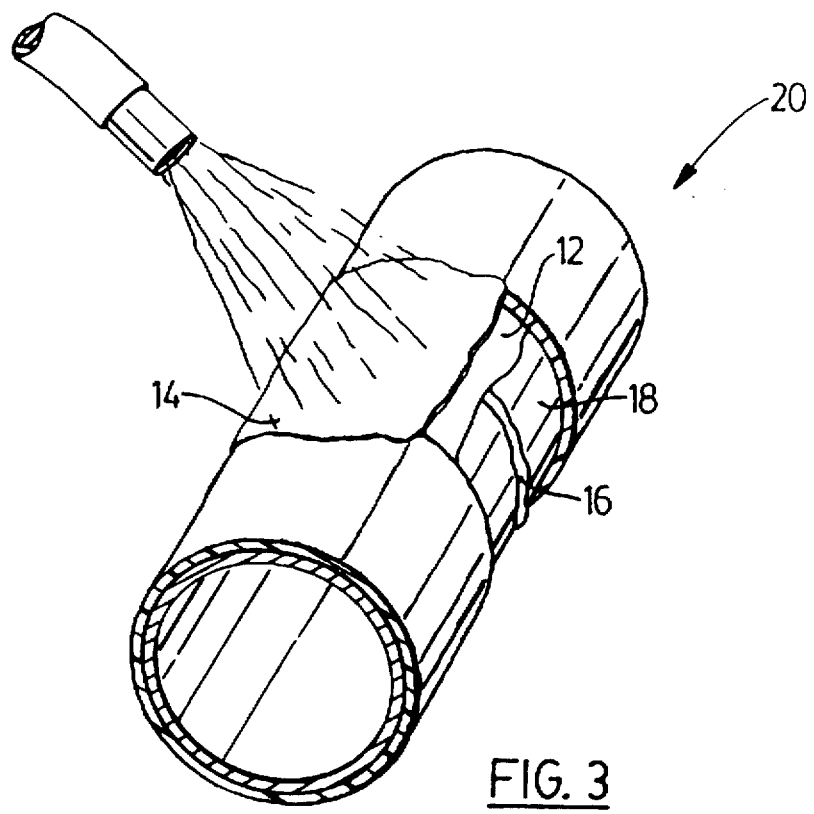
FIG. 3 shows the pipe of FIG. 2 partially coated during the coating process.
Figure 4:
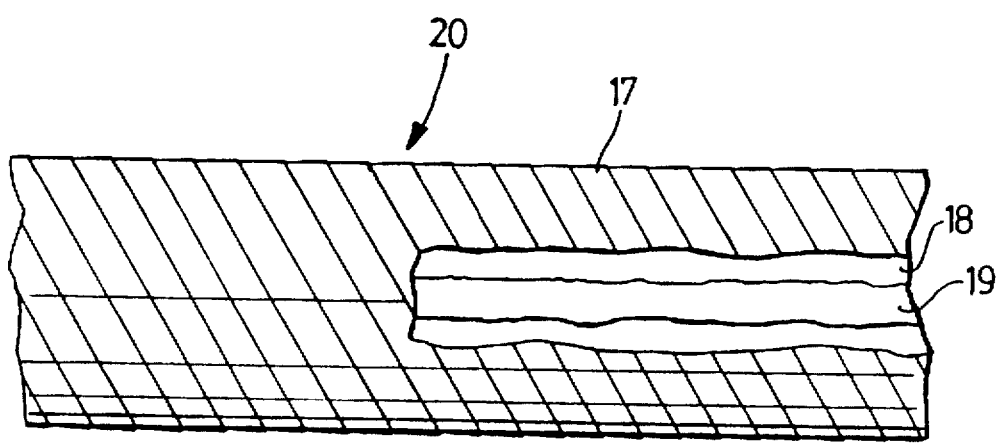
FIG. 4 shows a pipe having a longitudinal weld.
Figure 5:
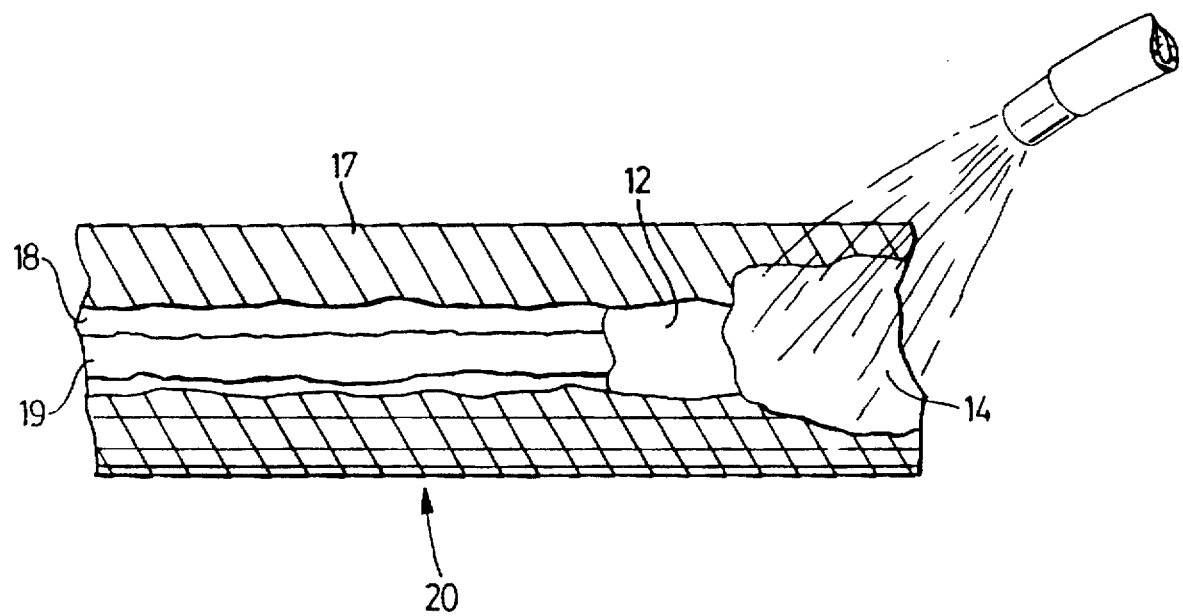
FIG. 5 shows the pipe of FIG. 4 partially coated during the coating process.

FIG. 4 shows a longitudinal weld treated in the same manner as that described for the girth weld of FIGS. 2 and 3. Similar reference numerals refer to similar parts. Pipe coating 17, which in this case is a tape wrap, is cleared away from the longitudinal weld 19 and a two step coating according to the Invention is applied.

Although the plastic material composite may be formed In situ by the method discussed above, It may also be formed as an additional, intermediate, step In the process. After the liquid undercoat has been applied, powdered polyolefin may be applied. This is also carried out at ambient temperature, and is akin to a dusting procedure. On application of the powdered polyolefin, the powder becomes occluded in the coating, but excess powder falls from the coating and does not adhere or otherwise combine with the undercoat, hence the analogy to a dusting procedure. While the powdered polyolefin so applied may be different from that of the undercoat, it is conveniently the same powdered polyolefin as fed to the thermospray apparatus.

The process of me invention Is a portable, field-applied, coating process. It is simple and economic in operation, and utilizes relatively Inexpensive and less bulky equipment for application of the coatings. As such, it is well suited for field application, including in remote areas where other equipment could not be readily located. Moreover, the process can frequently be utilized on an operating pipeline i.e. it is frequently unnecessary to cease operations of the pipeline in order to utilize the process of the invention to repair the pipeline.

The Invention will now be further described with reference to the following examples.

EXAMPLE 1

A 15 cm diameter steel pipe was treated according to the present invention. First the pipe was prepared by abrasive blasting using G25 steel grit to achieve a surface profile of 75–125 micron (3–5 mils) when measured with X-course press tape. Alter preparation for coating, the pipe was coated with a coating of KEMA 500 (KEMA 500 is a trade name of Kemacoat International for the combination of an epoxy based resin having a viscosity of 85 Kreb units at 65° C. and a curing agent having a viscosity of 75 Kreb units). The coating was applied in a thickness of 750 to 1000 microns (30–40 mils) at 65° C. by means of a GRACO FIYDRA-CAT™ spray unit In a ratio of 3:1 of resin:curing agent. The application pressure was 3000 psi.

The epoxy coating was allowed to begin curing to form a semi-cured film having a hardness which would be at about Shore "D" 40; full cure would achieve a hardness of Shore "D" 85. When the hardness of Shore "D" 60 was reached, at which time the no flow condition had been met, the epoxy coated pipe was heated to 150° C. and a coat was applied, using thermospraying, of ENVELON™ (Dow Chemical Company) ethylenelacylic acid resin. The topcoat was applied in a thickness of 750–1000 microns (30–40 mils). The pipe was then allowed to cool to ambient temperature.

The finished sample as tested using the Canadian Standards Association testing method for fusion bonded epoxy since no existing test method for the coating of the invention has been developed. Modifications for duration and temperature are noted as recorded.

| | Duration | Radius |
|---|---|---|
| CATHODIC DISBONDMENT | | |
| 65-C, 5% NaCl, Platinum Electrode, 1.5 Volt | 14 day | 2.5 mm disbondment |
| Calomel Electrode | 28 day | 5.5 mm disbondment |
| HOT WATER SOAK (90° C.) | 2 day | #1 PASS |
| | 14 day | #1 PASS |
| | 28 day | #1 PASS |
| | 56 day | #1 PASS |

Thus it can be seen that the coating shows strong attachment against disbandment and no loss of adhesion, after immersion, either adhesively or cohesively.

EXAMPLE 2

A 15 cm diameter steel pipe which had been previously wrapped with a tape formed of polyethylene film with a butyl rubber adhesive was treated according to the invention. The polyethylene tape was that known as POLYKEN™ tape (Kendall Corporation Inc.). The pipe included a weld seam running longitudinally along the pipe.

An area of the pipe in the region of the weld seam was prepared for repair according to the invention by removing the tape 3 inches from each side of the weld. Thereafter, abrasive blasting was carried out on the exposed area using silica sand which gave a surface profile of 75 to 100 microns (3–4 mils) with only minor abrasion to the surrounding tape. The surface was rated to be a NACE # 1 cleanliness for abrasive blasting.

The epoxy resin coating as described in Example 1 was applied to the steel substrate at ambient temperature and allowed to cure for 8 hours to a Shore "D" hardness of 50 i.e. when the coating would not flow. The application was done using a natural bristle paint brush. The epoxy coating was applied only to the exposed steel substrate making sure that contact with the polyethylene tape was kept to a minimum.

A topcoat of polyethylene having functional maleic anhydride groups was applied This modified polyethylene is known as FUSABOND manufactured by DuPont Canada Inc. The product had a melt flow index of 20 g/10 min. and was applied to the epoxy coating that had been preheated by flame to 150° C. The polyethylene coating was applied by thermospraying by flame so as to cover the epoxy coated area at a film build of 300–450 microns (12–18 mils) and to taper from this to 100 micron (4 mil) over a distance of 8 cm over the existing POLYKEN tape.

The sample was allowed to cool to 22° C. before testing was started. It was found that the cathodic disbandment and hot water soak tests gave similar results to those listed in Example 1. Additionally, a pull test was carried out and it was found that it was impossible to separate the tape from the applied polyethylene

EXAMPLE 3

An NPS 36 gas transmission pipeline that previously had been coated with 15 mil thick Polyken polyethylenelbutyl rubber tape wrap using a 50% overlap spiral wrapped procedure was treated according to the invention. The pipe was operating at 37° C. when treated according to the invention. The pipe had two longitudinal welds, positioned at the 10 o'clock and the 2 o'clock positions on the pipe.

The existing tape wrap was cleaned away from both sides of each longitudinal weld, to the extent of three inches above and three Inches below each weld, for a distance of 100 metres using an abrasive blast of silica sand # SIL 7. This procedure gave a cleaned surface profile to 2.5 mils but with only a minor or "sweet" blast applied to the remaining Immediately adjacent tape wrap.

An epoxy resin coating as described In Example 1 was applied, to a thickness of 20 mils, to the cleaned steel substrate at the pipe operating temperature and allowed to cure for two hours. The application of the coating was done using both a natural bristle paint brush and a short nap fibre roller. The epoxy coating was applied to the exposed cleaned steel surface, overlapping the existing adjacent tape wrap to a minimal extent.

A dry dusting of between 1 to 3 mils of powdered ENVELON ethylene/acrylic acid resin was applied, using forced air, at ambient temperature onto the still wet and uncured epoxy as well as onto the surrounding tape wrap.

After two hours, heat was applied to the .dusted layer of ethylene/acrylic acid resin, to a temperature of between 135° C. - 200° C., to melt the ethylene/acrylic acid resin and cause it to flow and "wet-out" over the surface of both the tape wrap and the epoxy resin. It then acted as an anchor for the remaining application of a topcoat of ENVELON ethylene/ acrylic acid resin. The topcoat was applied, to a thickness of 20 mils, using a flame thermospray unit (a Falcon flame-spray unit) onto the ethylene/acrylic acid-dusted epoxy and tape wrap surfaces. Surface temperatures approaching 220° C. were achieved by introducing a second heat source immediately in front of the thermospray application nozzle.

The pipe was then allowed to cool to its operating temperature and modified pull tests were performed on areas of the finished coating. Each pull test sample showed that the coating applied according to the invention exhibited excellent adhesion to the surrounding tape wrap. The latter appeared to be fused to the ethylenelacrylic acid topcoat. The topcoat also appeared to have co-mingled with the epoxy resin undercoat at the. interlayer between the two layers and could not be separated from the epoxy undercoat. The cured epoxy resin undercoat could only be removed from the metal (steel) substrate.with a sharp metal knife blade and then only chipping of the undercoat was observed.

EXAMPLE 4

An aged and dry block of concrete measuring two feet by three feet and one foot in depth was given a 'sweet'sand blast cleaning to remove surface contaminants and loose or weak particulate. A coating of epoxy resin (KEMA 500 epoxy resin) was applied using airless spray equipment (HYDRACAT, manufactured by the GRACO Company). The KEMA 500 epoxy resin was applied to a thickness of between 15–30 mils, at ambient temperature.

After a period of three hours, the epoxy resin was in a semi-cured state. It was coated with a topcoat of ENVELON ethylene/acrylic acid resin which was applied, at temperatures between 100° C. - 165° C., using a Falcon thermospray applicator to a thickness of between 12–29 mils. The finished two layer coating was allowed to cool to room temperature.

The coating was tested by gluing a ½ inch test fixture to the coating surface. The concrete around the test fixture was scored to create a core sample type test area and the amount of force required to pull the fixture from the substrate was measured.

An adhesive failure of the test sample occurred between the ethylene/acrylic acid topcoat and the KEMA 500 epoxy subcoat, implying that insufficient heat had been applied to the substrate at the time of topcoat application.

Another aged and dry concrete block having the same dimensions as the first was cleaned in the same manner. The epoxy resin was applied by spray equipment to a thickness of between 25–40 mils at ambient temperature. After a period of three hours, the now semi-cured KEMA 500 epoxy resin coating was coated with a topcoat of ENVELON ethylene/acrylic acid, using the Falcon thermospray applicator, to a thickness of between 20–30 mils. The ethylene/acrylic acid topcoat was applied at temperatures between 180° C. - 200° C. The finished two layer coating was allowed to cool to room temperature.

The finished coating was tested In the manner described above. A substrate cohesive failure of the test sample occurred within the concrete, indicating that sufficient heat had been applied at the time of topcoat application.

EXAMPLE 5

A 15 cm diameter steel pipe was treated according to the present invention. First the pipe was prepared by abrasive blasting using G25 steel grit to achieve a surface profile of 75–125 micron (3–5 mile) when measured with X-course press tape. After preparation for coating, the pipe was coated with a coating of VALPIPE 100 polyurethane resin. The coating was applied in a thickness of 750 to 1000 microns (30–40 mils) at 65° C. by means of a GRACO HYDRA-CAT# spray unit in a ratio of 3:1 of resin:curing agent. The application pressure was 3000 psi.

The polyurethane coating was allowed to begin curing to form a semi-cured film having a hardness which would be at about Shore "D" 40; full cure would achieve a hardness of Shore "D" 85. When the hardness of Shore "D" 60 was reached, at which time the no flow condition had been met, the polyurethane coated pipe was heated to 150° C. and a coat was applied, using thermospraying, of ENVELON# ethylene/acrylic acid resin. The topcoat was applied in a thickness of 750–1000 microns (30–40 mils). The pipe was then allowed to cool to ambient temperature.

The finished sample as tested using the Canadian Standards Association testing method for fusion bonded epoxy since no existing test method for the coating of the Invention has been developed. Modifications for duration and temperature are noted as recorded.

|                                                                | Duration | Radius |
| --- | --- | --- |
| CATHODIC DISBONDMENT |  |  |
| 65-C, 5% NaCl, Platinum Electrode, 1.5 Volt Calomel Electrode | 14 day | 7.0 mm disbondment |
| HOT WATER SOAK (90° C.) | 2 day | #1 PASS |
|  | 14 day | #1 PASS |

Thus it can be seen that the coating shows strong attachment against disbandment and no loss of adhesion, after immersion, either adhesively or cohesively.

We claim:

1. A method for repair of a defective section of a protective coating on the exterior of a metal pipeline in the field, comprising:

(a) stripping a portion of said protective coating from said pipeline, said portion including the defective section of the protective coating;

(b) forming a clean metal surface on said portion of the pipeline;

(c) applying an undercoat of at least 5 mil of liquid polyepoxide or polyurethane composition to said clean metal surface, said composition having a curing agent for said polyepoxide or polyurethane;

(d) optionally applying a non-melted, powder layer of a thermoplastic polyolefin selected from ethylene (meth) acrylic acid copolymers and polyolefins modified with functional ethylenically unsaturated carboxylic acid groups or derivatives by means of forced air onto the entire surface of the uncured undercoat and onto the protective coating adjacent thereto;

(e) allowing the undercoat to cure until the coating exhibits no flow when a stream of heated air is applied; and (f) thermospraying a topcoat of at least 5 mil of a thermoplastic polyolefin selected from ethylene/(meth) acrylic acid copolymers and polyolefins modified with functional ethylenically unsaturated carboxylic acid groups, or derivative thereof, onto said undercoat, said thermospraying being carried out at a temperature such that the polyolefin is molten and undergoes melt flow on contacting the undercoat and protective coating adjacent thereto.

2. The method of claim 1 in which the undercoat is also applied over the protective coating immediately adjacent to said clean metal surface.

3. The method of claim 2 in which a plastic material composite is formed.

4. The method of claim 3 in which, in an intermediate step, powdered thermoplastic polyolefin is applied to the liquid undercoat prior to curing thereof.

5. The method of claim 2 in which the layer of (d) is applied.

6. The method of claim 2 in which the layer of (d) is not applied.

7. The method of claim 2 in which the pipeline is at ambient temperature prior to application of the undercoat.

8. The method of claim 2 in which the pipeline is at a temperature above ambient temperature prior to application of the undercoat.

9. The method of claim 8 in which the section of the pipeline with the clean metal surface is heated prior to application of the undercoat.

10. The method of claim 2 in which the pipeline is being used for the conveying of fluids at the time said repair is being effected.

11. The method of claim 2 in which the clean metal surface is formed by sand blasting the portion of the metal pipeline from which the protective coating has been stripped.

12. The method of claim 2 in which the defective section is a minor section of the pipeline.

13. The method of claim 12 in which the defective section is characterized by separation of the coating from the metal pipeline.

14. The method of claim 12 in which the defective section is characterized by physical damage to the protective coating.

15. The method of claim 12 in which the defective section is characterized by cathodic disbandment of the protective coating from the metal pipeline.

16. The method of claim 12 in which the undercoat and topcoat have thicknesses in the range of 5–40 mils.

17. The method of claim 16 in which the undercoat and topcoat have thicknesses in the range of 10–20 mils.

18. The method of claim 12 in which the undercoat is polyepoxide and the coating is applied at a temperature of at least 10° C.

19. The method of claim 12 in which the undercoat is polyurethane and the coating is applied at a temperature of at least −20° C.

20. The method of claim 12 in which the time between application of the undercoat and application of the topcoat is 4–24 hours.

21. The method of claim 2 in which the thermoplastic polyolefin is a modified polyolefin.

22. The method of claim 2 in which the thermoplastic polyolefin is an ethylene/acrylic acid copolymer.

23. A method for application of an exterior protective coating on a minor section of a metal pipeline, comprising:

(a) providing a clean metal surface;

(b) applying an undercoat of at least 5 mil of liquid polyepoxide or polyurethane composition to said clean metal surface, said composition having a curing agent for said polyepoxide or polyurethane;

(c) optionally applying a non-melted, powder layer of a thermoplastic polyolefin selected from ethylene (meth) acrylic acid copolymers and polyolefins modified with functional ethylenically unsaturated carboxylic acid groups or derivatives by means of forced air onto the surface of the uncured undercoat and onto the protective coating adjacent thereto;

(d) allowing the undercoat to cure until the coating exhibits no flow when a stream of heated air is applied; and (e) thermospraying a topcoat of at least 5 mil of a thermoplastic polyolefin selected from ethylene/(meth) acrylic acid copolymers and polyolefins modified with functional ethylenically unsaturated carboxylic acid groups, or derivative thereof, onto said undercoat, said thermospraying being carried out at a temperature such that the polyolefin is molten and undergoes melt flow on contacting the undercoat and the protective coating adjacent thereto.

* * * * *

UNITED STATES PATENT AND TRADEMARK OFFICE
CERTIFICATE OF CORRECTION

PATENT NO. : 5,792,518
DATED : August 11, 1998
INVENTOR(S) : Mark Gibson

Page 1 of 5

It is certified that error appears in the above-identified patent and that said Letters Patent is hereby corrected as shown below:

ABSTRACT

Line 6, delete "metailic" and insert "metallic";
Line 7, delete "cathoadically" and insert "cathodically";
Line 8, delete "now" and insert "new";
Column 1, line 8, delete "Include" and insert "include";
Column 1, line 9, insert "/" in between the words "bitumen" and "polyethyl-";
Column 1, line 12, after the word "pipeline" insert --,--;
Column 1, line 23, insert "\" in between the words "film" and "bitumen";
Column 1, line 24, delete "petroleum" and insert "petrolatum";
Column 1, line 28, delete ":" and insert ";";
Column 1, line 28, delete "apoxy" and insert "epoxy";
Column 1, line 30, delete "twopart" and insert "two-part";
Column 1, line 32, delete "railer" and insert "roller";
Column 1, line 35, delete "substrate" and insert "substrates";
Column 1, line 36, delete "In" and insert "in";
Column 1, line 42, delete "apoxes" and insert "epoxies";
Column 1, line 46, delete "petroleum" and insert "petrolatum";
Column 1, line 52, delete "poxies" and insert "epoxies";
Column 1, line 53, delete "avid" and insert "and";
Column 1, line 60, delete ".", after the word "fitting";
Column 1, line 67, delete "petroleum" and insert "petrolatum";

UNITED STATES PATENT AND TRADEMARK OFFICE
CERTIFICATE OF CORRECTION

PATENT NO. : 5,792,518
DATED : August 11, 1998
INVENTOR(S) : Mark Gibson

It is certified that error appears in the above-identified patent and that said Letters Patent is hereby corrected as shown below:

Column 2, line 6, delete "hold-applied" and insert "field-applied";
Column 2, line 12-13, delete "petroleum" and insert "petrolatum";
Column 2, line 14, after "substrate" insert --;-- ;
Column 2, line 24, delete "mil" and insert "mill";
Column 2, line 29, delete "Moreoer" and insert "Moreover";
Column 2, line 32, delete "In" and insert "in";
Column 2, line 34, delete "disbandment" and insert "disbondment";
Column 2, line 44, after "layer" insert --,--;
Column 2, line 48, delete "disbandment" and insert "disbondment";
Column 2, line 54, after "powder" and insert --,--;
Column 2, line 56, delete "unable" and insert "usable";
Column 2, line 61, delete "substrate" and insert "substrates";
Column 3, line 6, delete "when-used" and insert "when used";
Column 3, line 10, delete "D1003DL" and insert "D1003LD";
Column 3, line 10, delete "Vaispar" and insert "Valspar";
Column 3, line 13, delete "Kama" and insert "Kema";
Column 3, line 17, delete "canusa" and insert "Canusa";
Column 3, line 18, delete "kemacoat intentional" and insert "Kemacoat International";
Column 3, line 23, delete "102" and insert "902";
Column 3, line 25, delete "No." and insert "Nos.";
Column 3, line 25, delete "4,045,355" and insert "4,048,355";
Column 3, line 26, delete "Sarnour at al" and insert "Samour et al.";
Column 3, line 26, delete "4,346" and insert "4,345";
Column 3, line 27, delete "MIyata" and insert "Miyata";
Column 3, line 27, delete "4,885,985" and insert "4,685,985";

UNITED STATES PATENT AND TRADEMARK OFFICE
CERTIFICATE OF CORRECTION

PATENT NO. : 5,792,518
DATED : August 11, 1998
INVENTOR(S) : Mark Gibson

It is certified that error appears in the above-identified patent and that said Letters Patent is hereby corrected as shown below:

Column 3, line 28, delete "4,519,883" and insert "4,519,863";
Column 3, line 28, delete "4,461,413" and insert "4,451,413";
Column 3, line 30, delete "90103850" and insert "90/03850";
Column 3, line 34, delete "Invention" and insert "invention";
Column 3, line 39, delete "costed" and insert "coated";
Column 3, line 39, delete "cost now" and insert "coat new";
Column 3, line 53, delete "polyepoxides" and insert "polyepoxide";
Column 3, line 65, delete "ethylenel(meth)" and insert "ethylene/(meth)";
Column 4, line 22, delete "." and insert ";";
Column 4, line 25, after "ethylene", insert --/--;
Column 4, line 29, delete "cut" and insert "out";

Column 4, line 60, delete "cost" and insert "coat";
Column 5, line 20, after "80° C", insert --to--;

Column 5, line 38, delete "heroin" and insert "herein";
Column 5, line 41, after "extent" and insert --,--;

UNITED STATES PATENT AND TRADEMARK OFFICE
CERTIFICATE OF CORRECTION

PATENT NO. : 5,792,518
DATED : August 11, 1998
INVENTOR(S) : Mark Gibson

It is certified that error appears in the above-identified patent and that said Letters Patent is hereby corrected as shown below:

Column 5, line 58, delete "14" and insert "is";
Column 5, line 63, delete "outbacks" and insert "cutbacks";
Column 5, line 64, delete "15" and insert "16";
Column 5, line 66, delete "SPS" and insert "SP6";
Column 6, line 3, delete "detective" and insert "defective";
Column 6, line 30, delete "550" and insert "650";
Column 6, line 31, delete "mat" and insert "that";
Column 6, line 41, delete "polypoxides" and insert "polyepoxides"
Column 6, line 42, delete "Komacoat international" and insert "Kemacoat International";
Column 6, line 46, delete "Valapar" and insert "Valspar";

Column 7, line 26, delete "ethylenelmethacrylic" and insert "ethylene/methacrylic";

Column 7, line 32, delete "Invention" and insert "invention";
Column 7, line 46, delete "of me invention Is" and insert "of the invention is";
Column 7, line 48, delete "Inexpensive" and insert "inexpensive";
Column 7, line 56, delete "Invention" and insert "invention";
Column 7, line 65, delete "Alter" and insert "After";
Column 8, line 4, delete "FIYDRA-" and insert "HYDRA-";
Column 8, line 5, delete "In" and insert "in";
Column 8, line 14, delete "ethylenelacylic" and insert "ethylene/acrylic";
Column 8, line 35, delete "disbandment" and insert "disbondment";

UNITED STATES PATENT AND TRADEMARK OFFICE
CERTIFICATE OF CORRECTION

PATENT NO. : 5,792,518
DATED : August 11, 1998
INVENTOR(S) : Mark Gibson

It is certified that error appears in the above-identified patent and that said Letters Patent is hereby corrected as shown below:

Column 9, line 6, delete "disbandment" and insert "disbondment";
Column 9, line 15, delete "polyethylenelbutyl" and insert "polyethylene/butyl";
Column 9, line 23, delete "Inches" and insert "inches";
Column 9, line 27, delete "Immediately" and insert "immediately";
Column 9, line 28, delete "In" and insert "in";
Column 9, line 57, delete "ethylenelacrylic" and insert "ethylene/acrylic";
Column 9, line 62, delete "substrate.with" and insert "substrate with";
Column 10, line 33, delete "180" and insert "160";
Column 10, line 45, delete "mile" and insert "mils";
Column 10, line 50, delete "#" and insert "TM";
Column 10, line 59, delete "#" and insert "TM";
Column 10, line 65, delete "Invention" and insert "invention";
Column 11, line 13, delete "disbandment" and insert "disbondment";
Column 12, line 18, delete "disbandment" and insert "disbondment";

Signed and Sealed this

Fifth Day of October, 1999

Attest:

Q. TODD DICKINSON

Attesting Officer

Acting Commissioner of Patents and Trademarks